(12) United States Patent
Ageishi

(10) Patent No.: US 8,024,619 B2
(45) Date of Patent: Sep. 20, 2011

(54) METHOD FOR RECOVERING FROM PCI BUS FAULT, RECORDING MEDIUM AND COMPUTER

(75) Inventor: Daisuke Ageishi, Tokyo (JP)

(73) Assignee: NEC Corporation, Tokyo (JP)

( * ) Notice: Subject to any disclaimer, the term of this patent is extended or adjusted under 35 U.S.C. 154(b) by 253 days.

(21) Appl. No.: 12/266,768

(22) Filed: Nov. 7, 2008

(65) Prior Publication Data

US 2009/0119546 A1    May 7, 2009

(30) Foreign Application Priority Data

Nov. 7, 2007   (JP) ................................. 2007-289333

(51) Int. Cl.
*G06F 11/00* (2006.01)
(52) U.S. Cl. ........................................... 714/43; 714/36
(58) Field of Classification Search ..................... 714/43
See application file for complete search history.

(56) References Cited

U.S. PATENT DOCUMENTS

| | | | | |
|---|---|---|---|---|
| 6,557,121 B1 * | 4/2003 | McLaughlin et al. | ........... | 714/44 |
| 6,904,546 B2 * | 6/2005 | Wu et al. | ......................... | 714/44 |
| 7,401,253 B2 * | 7/2008 | Winarski et al. | .................. | 714/8 |
| 7,552,371 B2 * | 6/2009 | Lu et al. | ......................... | 714/724 |
| 2003/0154339 A1 * | 8/2003 | Wu et al. | ........................ | 710/305 |
| 2006/0253766 A1 * | 11/2006 | Winarski et al. | ............... | 714/755 |
| 2007/0011500 A1 * | 1/2007 | Dasari et al. | ................... | 714/100 |
| 2008/0016405 A1 * | 1/2008 | Kitahara | .......................... | 714/43 |
| 2009/0083585 A1 * | 3/2009 | Liu et al. | ......................... | 714/43 |

FOREIGN PATENT DOCUMENTS

| | | |
|---|---|---|
| JP | 02-032445 | 2/1990 |
| JP | 2002-366375 | 12/2002 |
| JP | 2004-348335 | 12/2004 |

OTHER PUBLICATIONS

Japanese Patent Office issued a Japanese Office Action date Nov. 4, 2009, Application No. 2007-289333.

* cited by examiner

*Primary Examiner* — Scott T Baderman
*Assistant Examiner* — Kamini Patel
(74) *Attorney, Agent, or Firm* — Young & Thompson

(57) ABSTRACT

A bus fault detecting unit 21 detects a closed PCI bus, and outputs to an OS 1, a PCI card disconnection instructing signal that requires the OS 1 to disconnect PCI cards connected to the closed PCI bus and PCI buses downstream of this PCI bus. The OS 1 disconnects the designated PCI cards from its control, and outputs to a BIOS 2, a power-off instructing signal that instructs to turn off the power of the disconnected PCI cards. In response to this, a PCI card disconnection handling unit 23 activates a bus diagnosing unit 24, and the bus diagnosing unit 24 diagnoses whether the closed PCI bus functions normally or not. In a case where the closed PCI bus functions normally, a bus opening unit 25 opens the closed PCI bus.

3 Claims, 5 Drawing Sheets ent in the detectionMETHOD FOR RECOVERING FROM PCI BUS FAULT, RECORDING MEDIUM AND COMPUTER

BACKGROUND OF THE INVENTION

1. Field of the Invention

The present invention relates to a technique for recovering from a fault of a Peripheral Component Interconnect (PCI) bus, and particularly to a technique for a Basic Input/Output System (BIOS) to recover from a PCI bus fault by utilizing a hot plug function that is provided in an Operating System (OS) for each PCI card.

2. Description of the Related Art

There is known a computer device that closes (shuts down) a PCI bus when a fault occurs on the PCI bus. Here, most PCI bus faults are intermittent ones. Hence, in many cases, the closed (shut-down) PCI bus becomes usable when the computer device is rebooted. However, in this way, the computer device has to be rebooted: the problem here is that fault-tolerant operation cannot be realized.

As a computer device that overcomes this problem, Unexamined Japanese Patent Application KOKAI Publication No. 2002-366375 (hereinafter identified as "Patent Literature 1") discloses a computer device that needs not be stopped (needs not be turned off) to replace an I/O card (or a peripheral device) that has caused a fault. This computer device has two OSes, namely, a main OS and a sub OS. When an I/O card connected to the device via a PCI bus or the like and controlled by the main OS gets in fault, the computer device gets this I/O card in fault out of the control of the main OS and electrically disconnects it from the device itself. After the I/O card in fault is repaired or replaced with another one, the computer device electrically connects the repaired or replaced I/O card to itself. Then, the computer device checks the functioning condition of the repaired or replaced I/O card by using the sub OS, and returns the repaired or replaced I/O card to the control of the main OS if it functions normally. This computer device can realize fault-tolerant operation.

However, when determining whether a PCI bus (a PCI bus and an I/O card connected to the PCI bus) functions normally or not, it is necessary to consider the platform used by the OS (hardware on which the OS runs). In other words, the mechanism for checking the functioning condition of the PCI bus is dependent on the platform used by the OS. Therefore, a problem in determining whether a PCI bus functions normally or not by using the technique disclosed in Patent Literature 1 is that the OS has to have a built-in mechanism for checking the functioning condition of the PCI bus, which mechanism is matched to the platform used by the OS.

SUMMARY OF THE INVENTION

The present invention was made in view of the above problem, and an object of the present invention is to provide a method by which a computer, whose OS has no mechanism for checking the functioning condition of a PCI bus, suitable for the platform used by the OS, recovers from a fault of the PCI bus, a recording medium that stores a program for realizing, on a computer, a recovery by the above-described method from a PCI bus fault, and a computer that recovers from a PCI bus fault by the above-described method.

A method for recovering from a PCI bus fault according to a first aspect of the present invention includes:

a detecting step in which a BIOS detects a PCI bus that is closed;

a disconnection instructing step in which the BIOS instructs an OS that a PCI card connected to the PCI bus detected in the detecting step should be disconnected from control of the OS;

a power-off instructing step in which, response to the instructing of disconnection, the OS disconnects the PCI card connected to the PCI bus detected in the detecting step from control of the OS, and instructs the BIOS that power of the PCI card should be turned off;

a diagnosing step in which, in response to the instructing by the OS to turn off the power of the PCI card disconnected from control of the OS, the BIOS diagnoses whether the PCI bus detected in the detecting step functions normally or not; and an incorporation instructing step in which, in a case where the PCI bus detected in the detecting step is diagnosed in the diagnosing step as functioning normally, the BIOS opens the closed PCI bus, and instructs the OS that the PCI card disconnected from control of the OS should be laid under control of the OS.

A recording medium according to another aspect of the present invention is a recording medium that stores a BIOS program for controlling a computer to effect a recovery from a fault of a PCI bus included in the computer, and the BIOS program controls the computer to perform:

a detecting step of detecting a PCI bus that is closed;

a disconnection instructing step of instructing an OS to disconnect a PCI card connected to the PCI bus detected in the detecting step from control of the OS;

a diagnosing step of diagnosing whether the PCI bus detected in the detecting step functions normally or not, in response to an instruction to turn off power of the PCI card, given by the OS, which has disconnected the PCI card connected to the PCI bus detected in the detecting step from its control in response to the instructing of disconnection; and an incorporation instructing step of, in a case where the PCI bus detected in the detecting step is diagnosed in the diagnosing step as functioning normally, opening the closed PCI bus and instructing the OS to lay the PCI card under control of the OS, the PCI card disconnected from control of the OS.

A computer according to another aspect of the present invention is a computer that recovers from a PCI bus fault, and includes:

a detecting unit that detects a PCI bus that is closed;

a disconnection instructing unit that instructs an OS to disconnect a PCI card connected to the PCI bus detected by the detecting unit from control of the OS;

a power-off instructing unit that in response to the instructing of disconnection, disconnects the PCI card connected to the PCI bus detected by the detecting unit from control of the OS, and instructs a BIOS to turn off power of the PCI card;

a diagnosing unit that in response to the instructing by the power-off instructing unit to turn off the power of the PCI card disconnected from control of the OS, diagnoses whether the PCI bus detected by the detecting unit functions normally or not; and an incorporation instructing unit that, in a case where the diagnosing unit diagnoses that the PCI bus detected by the detecting unit functions normally, opens the closed PCI bus, and instructs the OS to lay the PCI card under the OS, the PCI card disconnected from control of the OS.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Next, the best mode for carrying out the present invention will be explained in detail with reference to the drawings.

Figure 1:
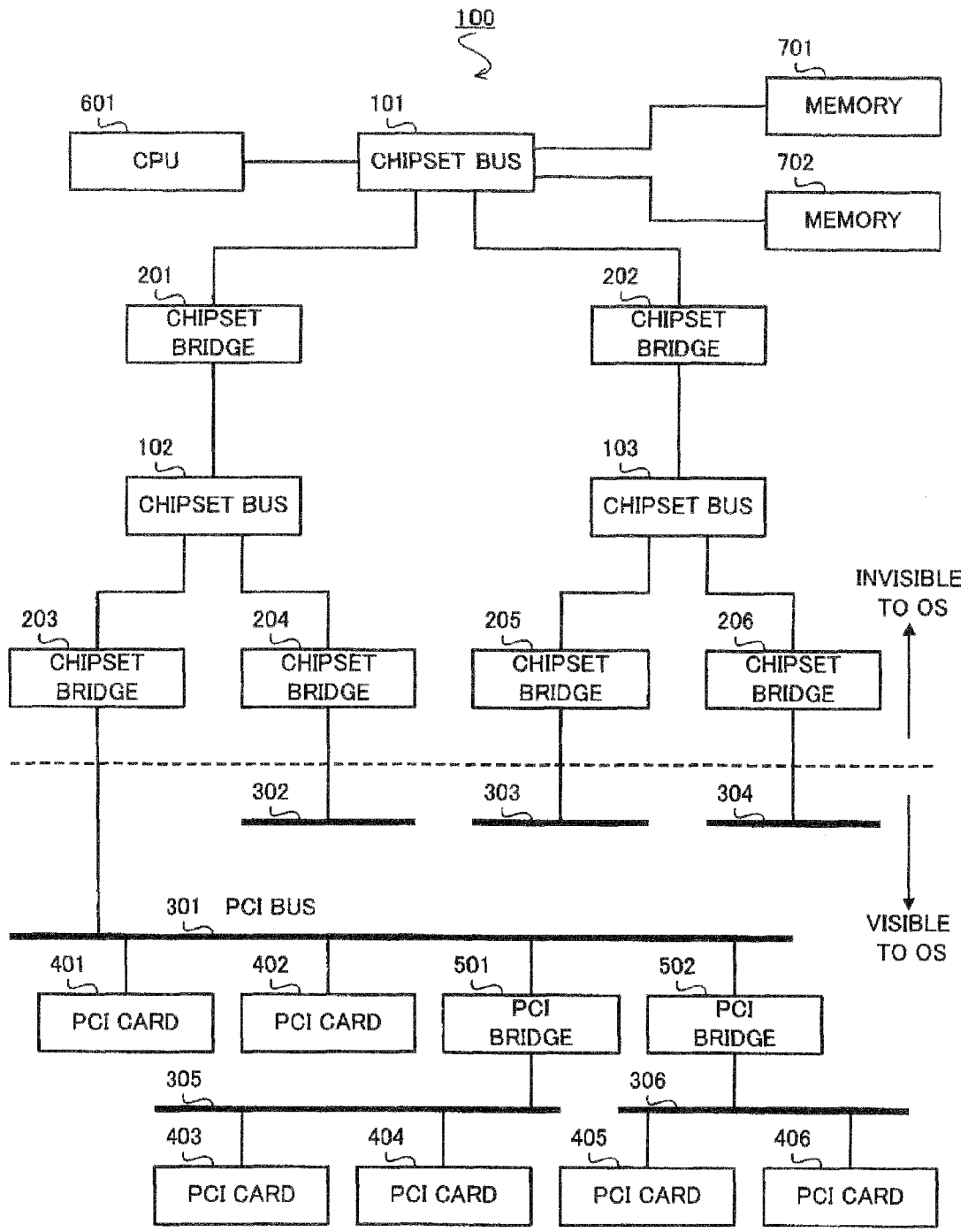
FIG. 1 is a block diagram showing one example of a bus system, to which a PCI bus fault recovery method according to the present invention is applied.

FIG. 1 is a block diagram showing one example of a bus system 100, to which a PCI bus fault recovery method according to the present invention is applied. The bus system 100 includes chipset buses 101 to 103, chipset bridges 201 to 206, PCI buses 301 to 306, PCI cards 401 to 406, PCI bridges 501 and 502, a CPU 601, a memory 701, and a memory 702. The chipset buses 101 to 103, which are more upstream (closer to the CPU 601) tan the PCI buses 301 to 306 are, are heavily dependent on the platform on which the OS is installed. Accordingly, the chipset buses 101 to 103 are visible to the BIOS, but invisible to the OS.

The CPU 601 is connected to the memory 701 and a memory 702 via the chipset bus 101. The CPU 601 executes programs such as programs for OS stored in the memory 701 and programs for BIOS stored in the memory 702. The chipset bus 101 is connected to the chipset buses 102 and 103 via the chipset bridges 201 and 202. The chipset bus 102 is connected to the PCI buses 301 and 302 via the chipset bridges 203 and 204 respectively. The chipset bus 103 is connected to the PCI buses 303 and 304 via the chipset bridges 205 and 206 respectively.

The PCI cards 401 and 402 are connected to the PCI bus 301. Further, the PCI buses 305 and 306 are connected to the PCI bus 301 via the PCI bridges 501 and 502 respectively. The PCI cards 403 and 404 are connected to the PCI bus 305, and the PCI cards 405 and 406 to the PCI bus 306.

Figure 2:
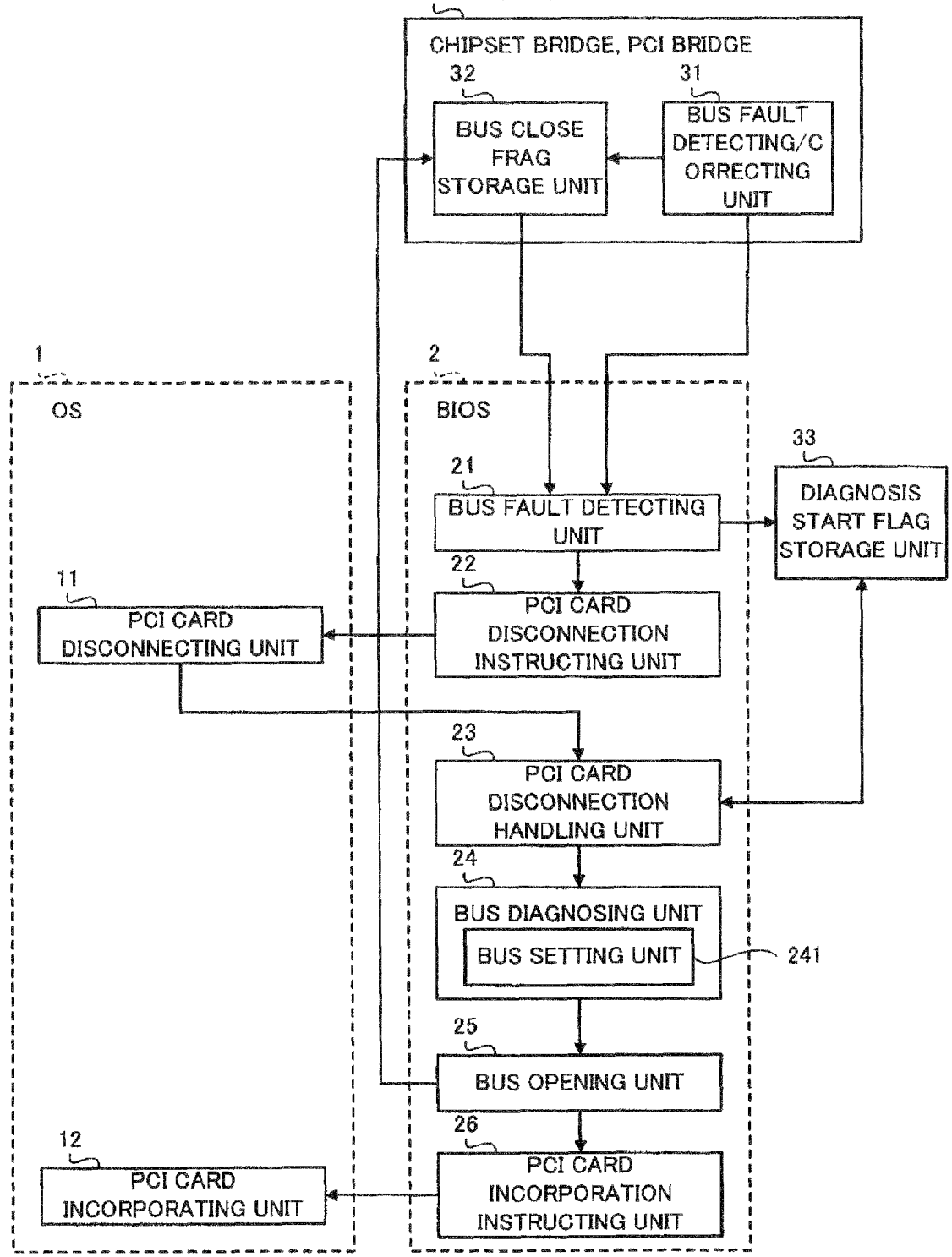
FIG. 2 is a functional block diagram of an OS and a BIOS, which are used in an embodiment of the present invention.

FIG. 2 is a block diagram for explaining the functions of the OS 1 and the BIOS 2. The OS 1 is realized by the CPU 601 executing the programs for OS stored in the memory 701. The BIOS 2 is realized by the CPU 601 executing the programs for BIOS stored in the memory 702.

The OS 1 has a hot plug function for adding or deleting a PCI card without stopping the computer. To realize this hot plug function, the OS 1 functionally includes a PCI card disconnecting unit 11 and a PCI card incorporating unit 12. Note that many standard OSes are equipped with a hot plug function.

The PCI card disconnecting unit 11 disconnects from control of the OS 1, a PCI card designated by a signal (hereinafter referred to as "PCI card disconnection instructing signal") that instructs that the PCI card should be disconnected. The PCI card disconnecting unit 11 has a function for outputting to the BIOS 2, a signal (hereinafter referred to as "power-off instructing signal") that instructs that the power of the disconnected PCI card should be turned off. The PCI card incorporating unit 12 has a function for making usable a PCI card that is designated by a signal (hereinafter referred to as "PCI card incorporation instructing signal") that instructs that the PCI card should be laid again under control of the system.

The BIOS 2 functionally includes a bus fault detecting unit 21, a PCI card disconnection instructing unit 22, a PCI card disconnection handling unit 23, a bus diagnosing unit 24, a bus opening unit 25, and a PCI card incorporation instructing unit 26.

The bus fault detecting unit 21 detects a chipset bus or PCI bus that has been closed (shut down) by referring to a bus close flag storage unit 32 provided in each of the chipset bridges 201 to 206 and the PCI bridges 501 and 502, upon receiving, from a bus fault detecting/correcting unit 31 provided in each of the bridges, a signal (hereinafter referred to as "bus close notifying signal") that notifies that a bus has been closed. Further, the bus fault detecting unit 21 turns a diagnosis start flag stored in a diagnosis start flag storage unit 33 to "1" (i.e., sets the flag). The diagnosis start flag storage unit 33 is constituted by a register or the like.

The bus fault detecting/correcting unit 31 provided in each bridge corrects any correctable error in data to be transferred upstream or downstream via the very bridge it is provided in, before transferring the data upstream or downstream. If data to be transferred downstream via the bridge it is provided in includes an uncorrectable error, the bus fault detecting/correcting unit 31 turns a bus close flag stored in the bus close flag storage unit 32 in the bridge it is provided in, to "1" (i.e., sets the flag), and turns the bus close flag stored in the bus close flag storage unit 32 in the bridge that is, by 1-tier, upstream of the bridge it is provided in, to "1". By this operation, the bus fault detecting/correcting unit 31 closes (shuts down) the PCI bus or the chipset bus that exists between the bridge it is provided in and the bridge that is 1-tier upstream of the bridge it is provided in. If data to be transferred upstream via the bridge it is provided in includes an uncorrectable error, the bus fault detecting/correcting unit 31 turns the bus close flag stored in the bus close flag storage unit 32 in the bridge it is provided in to "1", and also turns the bus close flag stored in the bus close flag storage unit 32 in the bridge that is 1-tier downstream of the bridge it is provided in, to "1". By this operation, the bus fault detecting/correcting unit 31 closes the PCI bus or the chipset bus that exists between the bridge it is provided in and the bridge that is 1-tier downstream of the bridge it is provided in.

For example, when data to be transferred upstream via the chipset bridge 203 includes an uncorrectable error, the bus fault detecting/correcting unit 31 in the bridge 203 turns the bus close flags stored in the bus close flag storage units 32 in the bridge 203 and in the PCI bridges 501 and 502 to "1" to close the PCI bus 301. Each bridge blocks data flow via itself while the bus close flag stored in the bus close flag storage unit 32 in itself is kept to "1". The bus fault detecting/correcting unit 31 outputs a bus close notifying signal to the BIOS 2 when closing down a PCI bus or a chipset bus.

The PCI card disconnection instructing unit 22 outputs to the OS 1, when the bus fault detecting unit 21 detects a closed (shut-down) PCI bus, a PCI card disconnection instructing signal that instructs that PCI cards connected to the detected PCI bus and all PCI buses that exist downstream of the detected PCI bus should be disconnected. The PCI card disconnection instructing unit 22 also outputs to the OS 1, when the bus fault detecting unit 21 detects a closed chipset bus, a PCI card disconnection instructing signal that instructs that PCI cards connected to all PCI buses that exist downstream of the detected chipset bus should be disconnected.

The PCI card disconnection handling unit 23 performs different processes according to whether a diagnosis start flag stored in the diagnosis start flag storage unit 33 is set or not (whether the flag is "1" or not), when it receives a power-off instructing signal from the OS 1. Specifically, when determined that the diagnosis start flag is not set, the PCI card disconnection handling unit 23 turns off the power of each PCI card that is designated. On the other hand, when determined that the diagnosis start flag is set, the PCI card disconnection handling unit 23 activates the bus diagnosing unit 24 and clears the diagnosis start flag (i.e., turns the flag to "0") without turning off the power of the PCI cards.

The bus diagnosing unit 24 diagnoses whether a closed chipset bus or PCI bus functions normally or not. The bus diagnosing unit 24 is embodied by, for example, a diagnosing program or the like installed onto the BIOS 2 and depending on the platform of the OS 1. The bus diagnosing unit 24 includes a bus setting unit 241 that sets setting values for a PCI bus or a chipset bus.

The bus opening unit 25 opens a closed chipset bus or a closed PCI bus, in a case where the bus diagnosing unit 24 diagnoses that the chipset bus or the PCI bus that has been closed functions normally. Specifically, the bus opening unit 25 turns the bus close flags stored in the bus close flag storage units 32 in the bus bridge that is 1-tier upstream of the diagnosed PCI bus and in the bus bridge that is 1-tier downstream of the diagnosed PCI bus to "0" (i.e., clears the flag).

The PCI card incorporation instructing unit 26 outputs to the OS 1, a PCI card incorporation instructing signal that instructs that the PCI cards designated by the PCI card disconnection instructing unit 22 to be disconnected should be laid again under control of the system.

Figure 3:
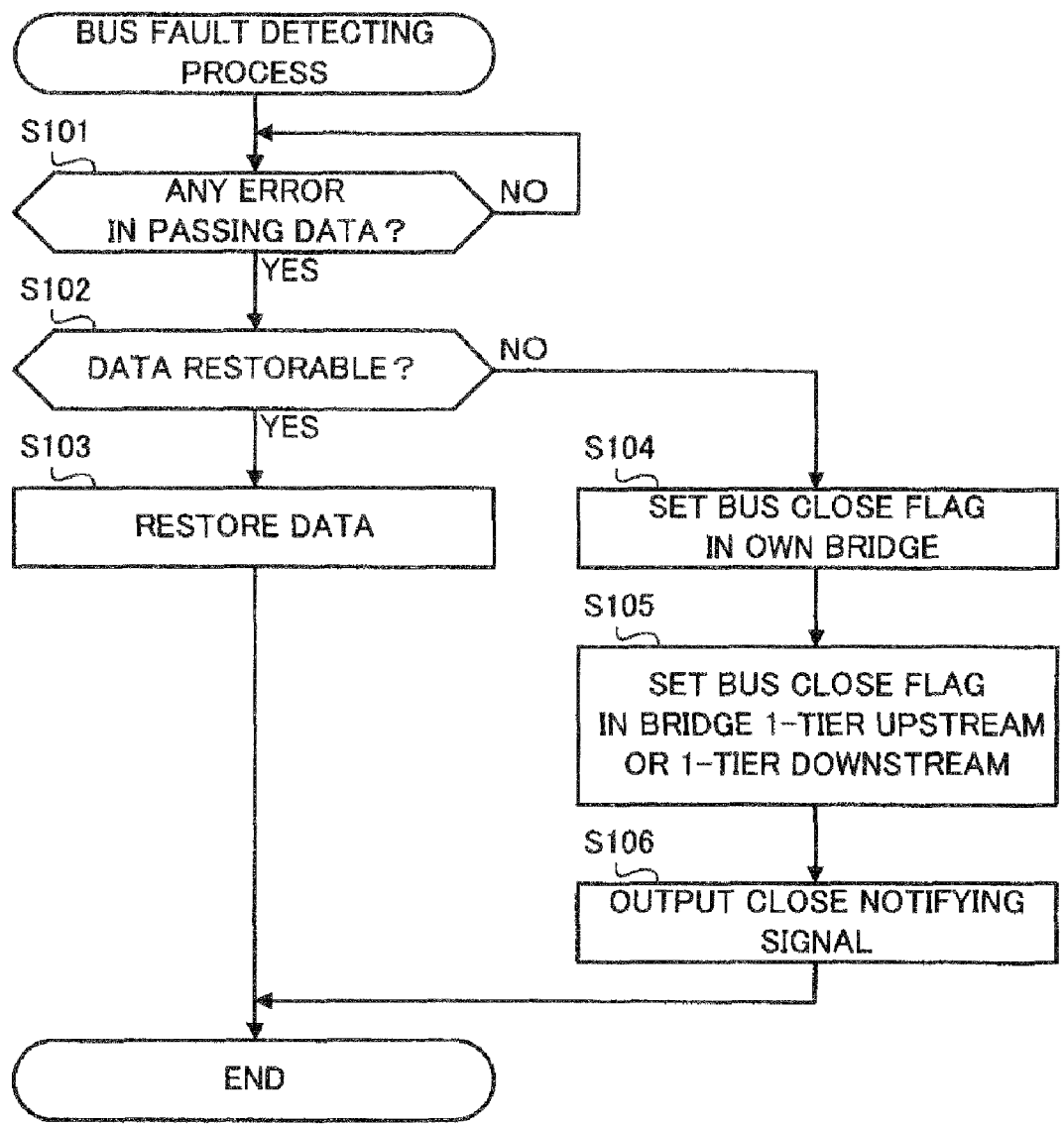
FIG. 3 is a flowchart showing one example of a bus fault detecting process performed by a bus bridge.
Figure 4:
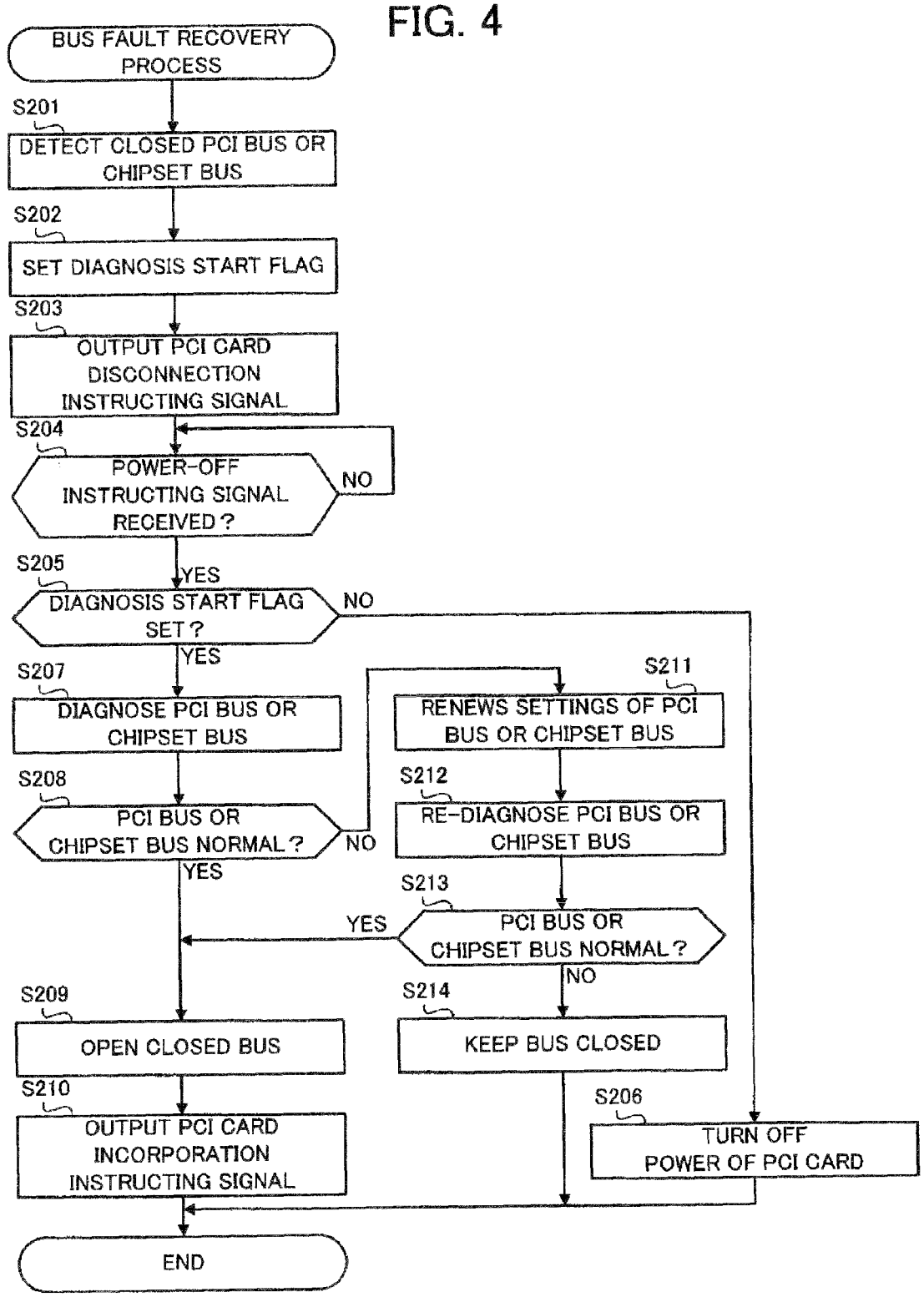
FIG. 4 is a flowchart showing one example of a bus fault recovery process performed by the BIOS.
Figure 5:
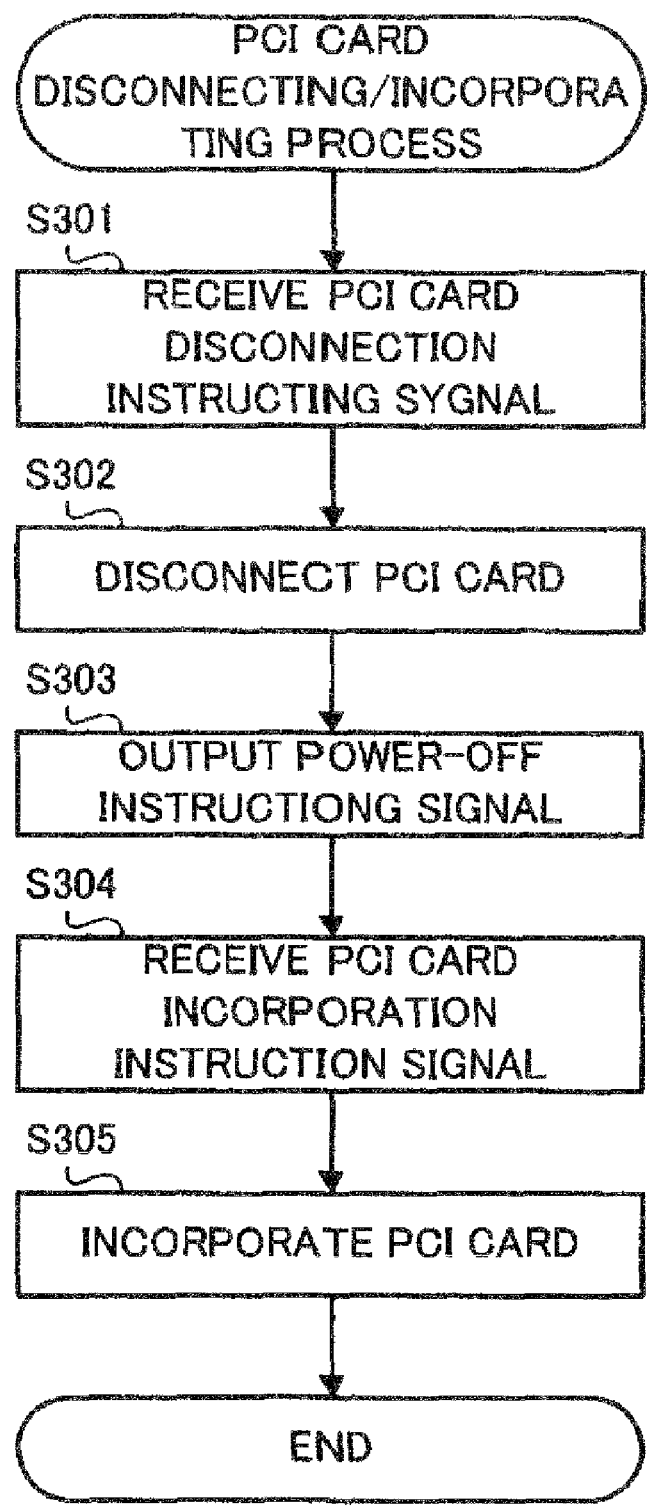
FIG. 5 is a flowchart showing one example of a PCI card disconnecting/incorporating process performed by the OS.

Next, operations of the bus system 100 according to the present embodiment will be explained in detail with reference to the flowcharts shown in FIG. 3 to FIG. 5. First, with reference to the flowchart shown in FIG. 3, a bus fault detecting process performed by the chipset bridges 203 to 206 and the PCI bridges 501 and 502 will be explained. In the following explanation, it is assumed that the chipset bridge 203 performs the bus fault detecting process.

First, the chipset bridge 203 determines whether data to pass through the chipset bridge 203 includes an error or not (step S101). The chipset bridge 203 repeats determining whether data to pass therethrough includes an error or not (step S101) as long as it is determined that data to pass therethrough does not include an error (step S101: NO). On the other hand, when determined that data to pass therethrough includes an error (step S101: YES), the chipset bridge 203 determines whether the erroneous data is restorable data or not (step S102).

In a case where it is determined that the erroneous data is restorable data (step S102: YES), the chipset bridge 203 corrects the error in the data and sends the corrected data out to the upstream bus or the downstream bus (step S103), and terminates the bus fault detecting process. On the other hand, in a case where it is determined that the erroneous data is not restorable data (step S102: NO), the chipset bridge 203 turns the bus close flag in itself to "1" (step S104), turns the bus close flag in the bridge that is 1-tier upstream or 1-tier downstream to "1" (step S105), outputs a bus close notifying signal to the BIOS 2 (step S106), and terminates the bus fault detecting process.

Suppose that an uncorrectable error has occurred in data to be transferred upstream via the chipset bridge 203. The bus fault detecting/correcting unit 31 in the chipset bridge 203 turns the bus close flag stored in the bus close flag storage unit 32 in the bridge 203 it is provided in to "1", when an uncorrectable error occurs in the data to be transferred upstream via the bridge 203 it is provided in. Further, the bus fault detecting/correcting unit 31 in the chipset bridge 203 turns the bus close flag stored in the bus close flag storage unit 32 in the PCI bridges 501 and 502 to "1". By doing so, the bus fault detecting/correcting unit 31 in the chipset bridge 203 closes the PCI bus 301 that has caused a fault. The bus fault detecting/correcting unit 31 in the chipset bridge 203 outputs a bus close notifying signal to the BIOS 2. Upon receiving the bus close notifying signal, the BIOS 2 performs a bus fault recovery process show in the flowchart shown in FIG. 4.

Next, with reference to FIG. 4, the bus fault recovery process performed by the BIOS 2 will be explained. Further, a PCI card disconnecting/incorporating process performed by the OS 1 will be explained in parallel with reference to FIG. 5.

The bus fault detecting unit 21 refers to the bus close flag storage unit 32 in each of the bridges 201 to 206, and 501 and 502 upon receiving a bus close notifying signal, to detect the closed PCI bus or chipset bus (step S201). In the above-described example, where the bus close flag stored in the bus close flag storage unit 32 in the chipset bridge 203 and the PCI bridges 501 and 502 has been turned to "1", the bus fault detecting unit 21 should detect that the PCI bus 301 that exists between the bridge 203 and the bridges 501 and 502 has been closed. After this, the bus fault detecting unit 21 sets the diagnosis start flag stored in the diagnosis start flag storage unit 33 (i.e., turns the flag to "1") (step S202).

When the bus fault detecting unit 21 detects that the PCI bus 301 has been closed, the PCI card disconnection instructing unit 22 outputs to the OS 1, a PCI card disconnection instructing signal that instructs that the PCI cards 401 and 402 connected to the PCI bus 301 and the PCI cards 403 to 406 connected to the PCI buses 305 and 306 that exist downstream of the PCI bus 301 should be disconnected (step S203).

Meanwhile, upon receiving the PCI card disconnection instructing signal from the BIOS 2 (step S301), the PCI card disconnecting unit 11 disconnects the designated PCI cards 401 to 406 from control of the OS 1 (step S302). After this, the PCI card disconnecting unit 11 outputs to the BIOS 2 via Advanced Configuration and Power Interface specification (ACPI), a power-off instructing signal that instructs that the power of the PCI cards 401 to 406 should be turned off (step S303).

In the meantime, the PCI card disconnection handling unit 23 determines whether or not it has received a power-off instructing signal (step S204). When it is determined that a power-off instructing signal is received (step S204: YES), the PCI card disconnection handing unit 23 determines whether or not the diagnosis start flag stored in the diagnosis start flag storage unit 33 is set (step S205). The PCI card disconnection handling unit 23 repeats determining whether or not it has received a power-off instructing signal (step S204) as long as it is determined that a power-off instructing signal is not received (step S204: NO).

In a case where it is determined that the diagnosis start flag is not set (step S205: NO), the PCI card disconnection handling unit 23 turns off the power of the PCI cards designated by the power-off instructing signal (step S206), and terminates the bus fault recovery process. When the diagnosis start flag is not set, it can be considered that the OS 1 has output the power-off instructing signal in order to enable the hot plug function.

On the other hand, in a case where it is determined that the diagnosis start flag is set (step S205, YES), the PCI card disconnection handling unit 23 clears the diagnosis start flag (i.e., turns the flag to "0"), and at the same time activates the bus diagnosing unit 24. When the diagnosis start flag is set, it can be considered that the closed PCI bus or chipset bus needs to be diagnosed. Hence, the bus diagnosing unit 24 diagnoses whether the closed PCI bus or chipset bus functions normally or not (step S207). In the above-described example, the bus diagnosing unit 24 diagnoses whether the PCI bus 301 functions normally or not. Various diagnosing methods can be used. The bus diagnosing unit 24 may diagnose the PCI bus 301 by releasing the PCI bus 301 from the closed state, if necessary. In the case where the closed PCI bus 301 is opened in order to be diagnosed, the bus diagnosing unit 24 again closes the PCI bus 301 after the diagnosis.

The bus diagnosing unit 24 determines whether the PCI bus 301 functions normally or not (step S208). In a case where the bus diagnosing unit 24 determines that the PCI bus 301 functions normally (step S208: YES), the bus opening unit 25 turns a predetermined bus close flag to "0" to open the closed PCI bus or chipset bus (step S209). In the above-described example, the bus opening unit 25 turns the bus close flags stored in the bus close flag storage units 32 in the chipset bridges 203 and the PCI bridges 501 and 502 to "0" to open the closed PCI bus 301. After this, the PC card incorporation instructing unit 26 outputs to the OS 1, a PCI card incorporation instructing signal that instructs that the PCI cards 401 to 406 should be laid under control of the OS 1 (step S210). Upon receiving the PCI card incorporation instructing signal (step S304), the PCI card incorporating unit 12 lays the PCI cards under control of the OS 1 (step S305). Specifically, the PCI card incorporating unit 12 brings into the usable state the PCI cards 401 to 406 that are designated by the PCI card incorporation instructing signal by loading the drivers for the PCI cards, making initial settings of the PCI cards, or the like.

On the other hand, in a case where the diagnosing unit 24 determines that the PCI bus 301 does not function normally (step S208: NO), the bus setting unit 241 provided in the bus diagnosing unit 24 renews the settings of the closed PCI bus or chipset bus (step S211). After this, the bus diagnosing unit 24 retries diagnosing whether the closed PCI bus or chipset bus functions normally or not (step S212). In this example, the bus setting unit 241 renews the settings (settings concerning bus number, memory range, max payload size, etc.) of the PCI bus 301, and then the bus diagnosing unit 24 diagnoses whether the PCI bus 301 functions normally or not. Here, the bus setting unit 241 renews the settings of the PCI bus because there is a possibility that, in a case where the values set for the PCI bus 301 have been broken, the PCI bus 301 may be restored (function normally) if the settings are renewed.

Then, the bus diagnosing unit 24 again determines whether the PCI bus 301 functions normally or not (step S213). In a case where the bus diagnosing unit 24 determines that the PCI bus 301 does not function normally (step S213: NO), the bus opening unit 25 keeps the PCI bus 301 in the closed state (step S214). On the other hand, in a case where the bus diagnosing unit 24 determines that the PCI bus 301 functions normally (step S213: YES), the above-described process from step S209 is performed.

In the above-described embodiment, the diagnosis start flag is stored in the diagnosis start flag storage unit 33, so that the BIOS 2 may perform different processes according to the status of the diagnosis start flag (the BIOS 2 may take different courses of action when the determination result at step S205 is YES and when the result is NO) when it receives a power-off instructing signal from the OS 1. However, the diagnosis start flag may not be used. In this case, when the BIOS 2 receives a power-off instructing signal from the OS 1, it always turns off the power of the PCI cards designated by the power-off instructing signal, and after this, performs the process from step S207.

According to the present embodiment, a highly reliable determination for opening against closed PCI buses can be made even if the OS 1 does not have a built-in mechanism, matched to the platform used by the OS 1, for checking the functioning condition of the PCI buses. This is because the BIOS 2 depending on the platform of the OS 1 diagnoses whether a closed PCI bus functions normally or not.

Further, according to the present embodiment, it is also possible to recover from faults of chipset busses that are heavily dependent on the platform of the OS 1. This is because the BIOS 2 depending on the platform of the OS 1 diagnoses whether a closed chipset bus functions normally or not.

Further, according to the present embodiment, the bus setting unit 241 renews the setting values of a PCI bus that is diagnosed as not functioning normally. Accordingly, it is possible to achieve an effect that a PCI bus that causes a fault because its setting values are broken can be restored.

Furthermore, according to the present embodiment, the diagnosis start flag is set when a closed PCI bus is detected. Therefore, when a power-off instructing signal is supplied by the OS 1, it is possible to discriminate whether to diagnose the PCI bus or to turn off the power of PCI cards according to the status of the diagnosis start flag.

The present invention can be applied to a PCI bus-inclusive computer device, which is required to realize fault-tolerant operation.

Various embodiments and changes may be made thereunto without departing from the broad spirit and scope of the invention. The above-described embodiment is intended to illustrate the present invention, not to limit the scope of the present invention The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-289333 filed on Nov. 7, 2007 and including specification, claims, drawings and summary. The disclosure of the above Japanese Patent Application is incorporated herein by reference in its entirety.

What is claimed is:

1. A method for recovering from a PCI bus fault, comprising:
   a detecting step in which a BIOS detects a PCI bus that is closed;
   a disconnection instructing step in which the BIOS instructs an OS that a PCI card connected to the PCI bus detected in said detecting step should be disconnected from control of the OS;
   a power-off instructing step in which, in response to the instructing of disconnection, the OS disconnects the PCI card connected to the PCI bus detected in said detecting step from control of the OS, and instructs the BIOS that power of the PCI card should be turned off;
   a diagnosing step in which, in response to the instructing by the OS to turn off the power of the PCI card disconnected from control of the OS, the BIOS diagnoses whether the PCI bus detected in said detecting step functions normally or not;
   an incorporation instructing step in which, in a case where the PCI bus detected in said detecting step is diagnosed in said diagnosing step as functioning normally, the BIOS opens the closed PCI bus, and instructs the OS that the PCI card disconnected from control of the OS should be under control of the OS;
   a setting renewing step in which, in a case where the PCI bus detected in said detecting step is diagnosed in said diagnosing step as not functioning normally, the BIOS renews a setting value of the PCI bus; and a re-diagnosing step in which the BIOS re-diagnoses whether the PCI bus detected in said detecting step functions normally or not after performing said setting renewing step, wherein in said incorporation instructing step, in a case where the PCI bus detected in said detecting step is diagnosed in said re-diagnosing step as functioning normally, the BIOS opens the closed PCI bus, and instructs the OS that the PCI card connected to the PCI bus should be laid under control of the OS.

2. A recording medium that stores a BIOS program for controlling a computer to effect a recovery from a fault of a PCI bus included in the computer, the BIOS program controlling the computer to perform:

a detecting step of detecting a PCI bus that is closed;

a disconnection instructing step of instructing an OS to disconnect a PCI card connected to the PCI bus detected in said detecting step from control of the OS;

a diagnosing step of diagnosing whether the PCI bus detected in said detecting step functions normally or not, in response to an instruction to turn off power of the PCI card, given by the OS, which has disconnected the PCI card connected to the PCI bus detected in said detecting step from its control in response to the instructing of disconnection;

a setting renewing step of, in a case where the PCI bus detected in said detecting step is diagnosed in said diagnosing step as not functioning normally, renewing a setting value of the PCI bus; and a re-diagnosing step of re-diagnosing whether the PCI bus detected in said detecting step functions normally or not after said setting renewing step is performed, wherein in said incorporation instructing step, in a case where the PCI bus detected in said detecting step is diagnosed in said re-diagnosing step as functioning normally, the closed PCI bus is opened, and the OS is instructed to lay the PCI card connected to the PCI bus under control of the OS.

3. A computer that recovers from a PCI bus fault, comprising:

a detecting unit that detects a PCI bus that is closed;

a disconnection instructing unit that instructs an OS to disconnect a PCI card connected to the PCI bus detected by said detecting unit from control of the OS;

a power-off instructing unit that, in response to the instructing of disconnection, disconnects the PCI card connected to the PCI bus detected by said detecting unit from control of the OS and instructs a BIOS to turn off power of the PCI card;

a diagnosing unit that, in response to the instructing by said power-off instructing unit to turn off the power of the PCI card disconnected from control of the OS;

diagnoses whether the PCI bus detected by said detecting unit functions normally or not;

an incorporation instructing unit that, in a case where said diagnosing unit diagnoses that the PCI bus detected by said detecting unit functions normally, opens the closed PCI bus, and instructs the OS to lay the PCI card under control of the OS, the PCI card disconnected from control of the OS;

a setting renewing unit that, in a case where said diagnosing unit diagnoses that the PCI bus detected by said detecting unit does not function normally, renews a setting value of the PCI bus; and a re-diagnosing unit that re-diagnose whether the PCI bus detected by said detecting unit functions normally or not, after said setting renewing unit renews the setting value of the PCI bus, wherein in a case where said re-diagnosing unit diagnoses that the PCI bus detected by said detecting unit functions normally, said incorporation instructing unit opens the closed PCI bus, and instructs the OS to lay the PCI card connected to the PCI bus under control of the OS.

* * * * *